United States Patent [19]

Schenone et al.

[11] 4,433,978
[45] Feb. 28, 1984

[54] FLUIDIZED BED GASIFICATION ASH REDUCTION AND REMOVAL SYSTEM

[75] Inventors: Carl E. Schenone, Madison; Joseph Rosinski, Vanderbilt, both of Pa.

[73] Assignee: Westinghouse Electric Corp., Pittsburgh, Pa.

[21] Appl. No.: 342,024

[22] Filed: Jan. 21, 1982

[51] Int. Cl.³ .............................................. C10J 3/72
[52] U.S. Cl. ........................................ 48/76; 48/77;
 48/87; 209/139 R; 110/167; 126/182; 422/110; 422/145
[58] Field of Search .................... 48/66, 76, 77, 87;
 422/110, 145; 209/139 R; 110/167; 126/182

[56] References Cited

U.S. PATENT DOCUMENTS

| 2,118,651 | 5/1938 | Macchi | 110/101 |
|---|---|---|---|
| 2,519,340 | 8/1950 | Bailey | 48/197 |
| 2,548,086 | 4/1951 | West et al. | 126/182 X |
| 2,594,974 | 4/1952 | Mylting | 241/36 |
| 2,626,210 | 1/1953 | Schlepper | 48/87 |
| 3,847,562 | 11/1974 | Hamilton | 48/76 |
| 3,957,458 | 5/1976 | Squires | 48/73 |
| 3,957,459 | 5/1976 | Mitchell et al. | 48/197 R |
| 4,073,629 | 2/1978 | Funk | 48/77 |
| 4,126,519 | 11/1978 | Murray | 201/32 |
| 4,134,738 | 1/1979 | Bress et al. | 48/66 X |
| 4,137,051 | 1/1979 | Godwin | 48/66 |
| 4,142,868 | 3/1979 | Gencsoy et al. | 48/86 R |
| 4,154,582 | 5/1979 | Woodmansee | 48/210 |
| 4,309,194 | 1/1982 | Salvador et al. | 48/76 |

*Primary Examiner*—Arthur D. Kellogg
*Attorney, Agent, or Firm*—W. E. Otto

[57] ABSTRACT

In a fluidized bed gasification system an ash removal system to reduce the particulate ash to a maximum size or smaller, allow the ash to cool to a temperature lower than the gasifier and remove the ash from the gasifier system. The system consists of a crusher, a container containing level probes and a means for controlling the rotational speed of the crusher based on the level of ash within the container.

24 Claims, 9 Drawing Figures

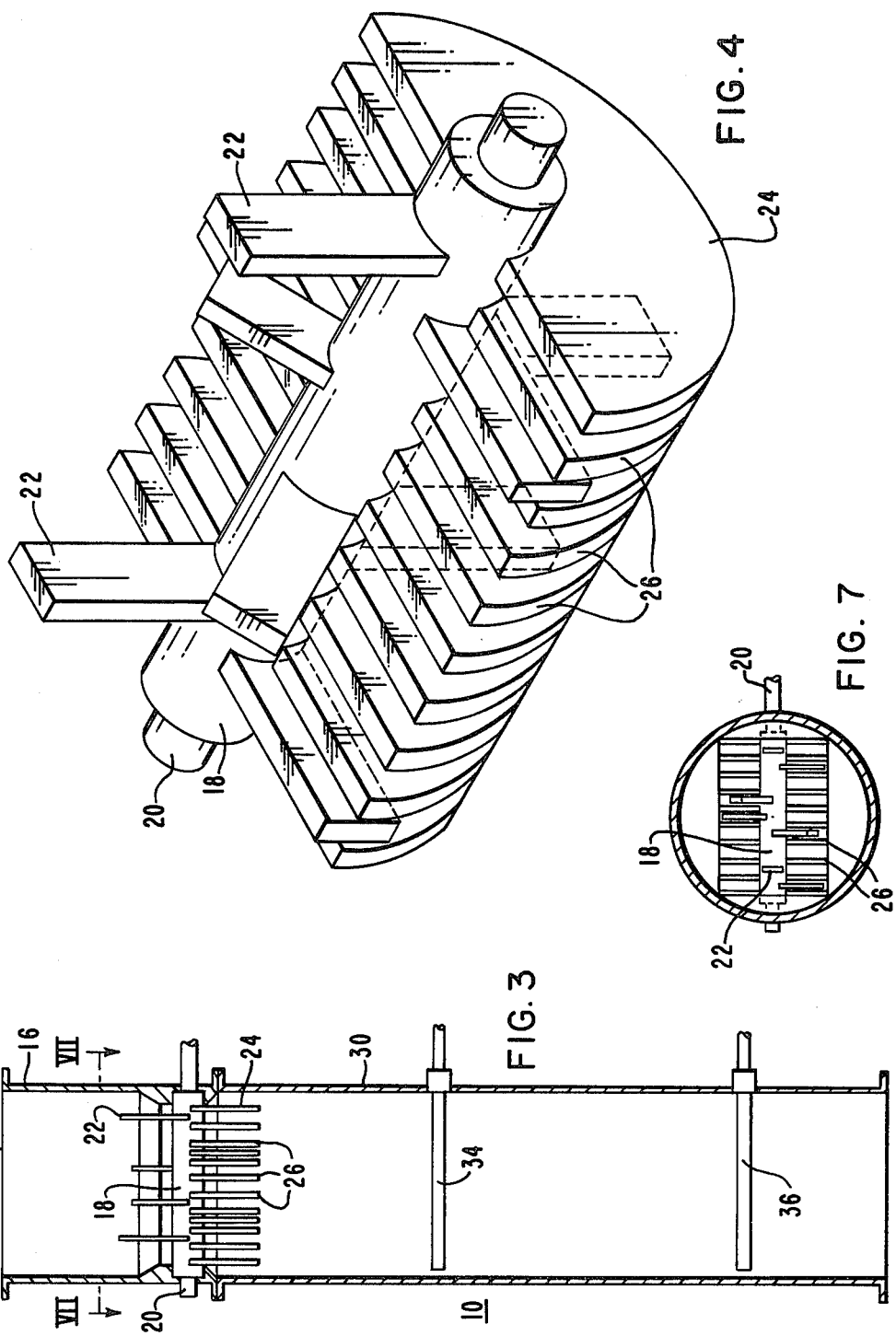

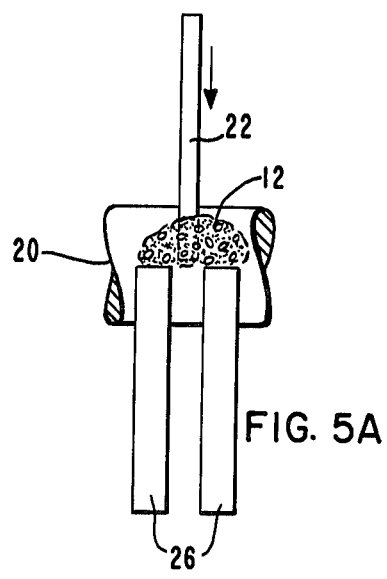
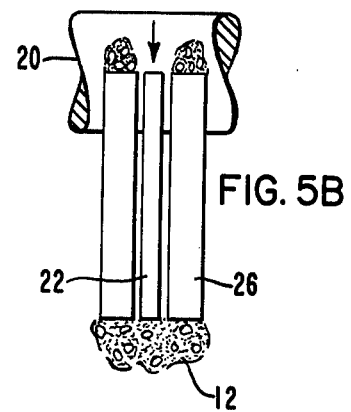
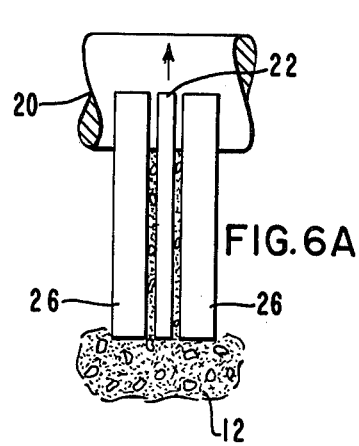
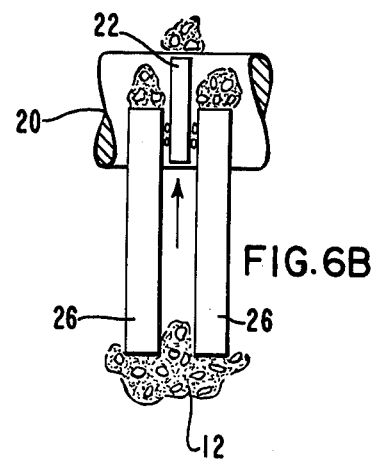
FIG. 5A
FIG. 5B
FIG. 6A
FIG. 6B

FLUIDIZED BED GASIFICATION ASH REDUCTION AND REMOVAL SYSTEM

GOVERNMENT CONTRACT CLAUSE

The invention disclosed herein was made or conceived in the course of, or under, a contract with the U.S. Government identified as No. DE-AC01-80-ET-14752.

BACKGROUND OF THE INVENTION

1. Field of the Invention

This invention relates to gasification of carbonaceous materials, and more particularly to apparatus for removal of ash from fluidized bed gasification reactors.

2. Description of the Prior Art:

In reactors for the gasification of carbonaceous materials, such as coal, a combustible product gas is produced, as well as solid waste products such as agglomerated ash. In the Process Development Unit (PDU) fluidized bed gasification reactor being operated for the U.S. Government, particulate coal is injected through the central one of a number of concentric tubes extending upwardly into the center of a vertical bed containing pressure vessel. Fluidization occurs in the upper sections.

Fluidization and combustion support gases have been injected into the PDU in various manners, including vertically through the concentric tubes, radially from the concentric tubes, and through sparger rings disposed at selected elevations within the vessel. Other gasification reactors discharge a fluidizing gas into vertical vessels through perforated plates positioned near the bottom of the vessel.

In the PDU fluidized bed gasification reactor, particulated feed coal, in addition to producing a combustible product gas, intermediately forms char, and ultimately forms waste ash. The process takes place at temperatures in the range of 1400° F. to 1900° F., and above. The ash must be removed from the vessel, preferably continuously or by an on-line batch process, in order to maintain the process efficiently operational. It is also desirable to remove the ash at a low temperature, less than about 500° F., to minimize the impact of heat transfer on downstream components and to decrease heat loss. This can necessitate a long vessel with an elongated lower section through which downward movement of the dense ash takes place over an extended period of time, thus allowing sufficient cooling of the ash prior to removal from the vessel.

As the ash cools, it tends to agglomerate in large particles. If left untreated, in a continuous flow process, the cooling of the ash would be impeded and it is possible the elongated lower section of the vessel could become fouled or plugged. These particles are sometimes large enough to block ash removal through a starwheel feeder located at the bottom of the gasifier. Additionally, after removal from the gasification system, particles of a maximum size or smaller are easier to handle.

It is thus desirable to provide gasifiers with an effective means for reducing particulate waste to a maximum size, allowing such waste to cool from gasifier temperature and removing such waste from the gasifier system.

SUMMARY OF THE INVENTION

This invention provides a particulate waste reducing and removal system.

In the improved gasification system, particulate waste from a gasifier falls through an elongated section of the gasifier to a crusher situated on a grate. Beneath the crusher is an enlarged container, which will fill as the ash falls. The crusher operates until the container is almost full. At this point, a first level detector is activated, and a control system stops operation of the crusher. This provides (1) opportunity for the container to empty below the crusher, and (2) protection against operation of the crusher blades into the container against the packed particulate. After this first level detector is deactivated, the crusher resumes operation. In the preferred form, a second level detector is installed in the container at a lower elevation than the first detector. After the container has emptied below the second level detector, this second level detector is deactivated and the control system starts operation of the crusher.

BRIEF DESCRIPTION OF THE DRAWINGS

The advantages, nature and additional features of the invention will become more apparent from the following description, taken in connection with the accompanying drawings, in which:

FIG. 3 is a sectional view of the ash reduction and removal system in accordance with the invention;

FIG. 4 is an elevational view of the crusher in accordance with the invention; and FIGS. 5A, 5B, 6A and 6B are elevational views of the crusher blades;

FIG. 7 is a sectional view of the ash reduction and removal system from FIG. 3 at line 7—7.

DESCRIPTION OF THE PREFERRED EMBODIMENT

Figure 1:
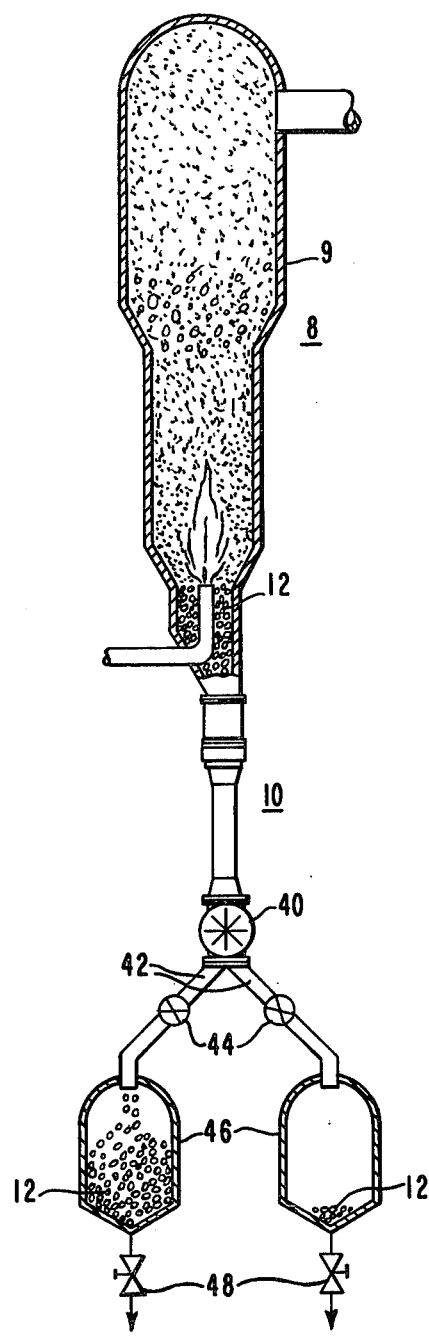
FIG. 1 is a partial sectional front elevational view of a typical gasifier system with an ash removal system in accordance with the existing art.

Referring now to FIG. 1, there is shown a typical fluidized bed gasification system 8 with a solid particulate waste removal system 10. After gasification, a solid waste product, such as a particulate ash 12, is formed. A gasifier 9 is connected by ash discharge lines 42 to ash hoppers 46. Components which may be below the gasifier 9 are a starwheel lock hopper 40, an ash hopper isolation valve 44, the ash hoppers 46 and ash hopper drain valves 48, the general purpose of the components being to maintain gasifier pressure during discharge of ash. The starwheel lock hopper 40, the ash hoppers 46 and valves 44 and 48 are well known in the industry.

Referring now to FIGS. 2, 3, 4 and 7, there can be seen an inlet plenum 14. Below the plenum 14 is a crusher housing 16 containing a crusher 18 affixed to a grate 24.

The crusher 18 is composed of a rotor 20, to which are attached a plurality of crusher blades 22. The crusher 18 is mounted in such a manner that the crusher rotor 20 rests above the grate 24 and penetrates the crusher housing 16 so that an external means, such as a motor 28, may be used to rotate the crusher 22. The grate 24 is composed of a plurality of grate blades 26 fixedly attached to the crusher housing 16 and separated by such a distance that each crusher blade 22 will pass between two grate blades 26. The distance between each grate blade 26 is such that small ash particles 12 may continue to pass through the grate 24 even when the crusher 18 is not rotating.

Figure 2:
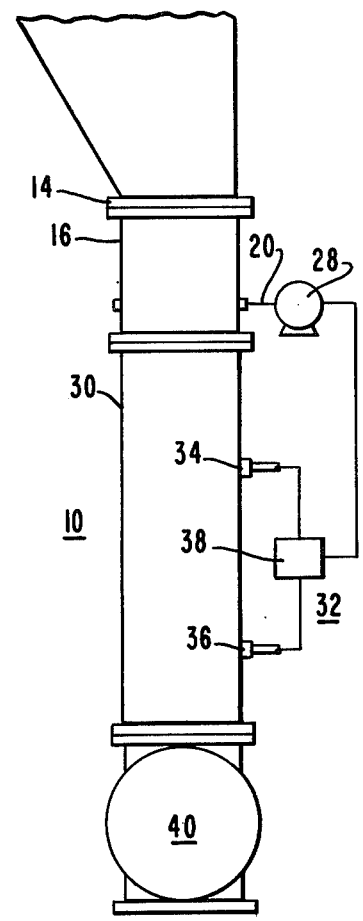
FIG. 2 is a front elevational view of the ash discharge section of a typical gasifier system with the addition of the ash reduction and removal system in accordance with the invention.

Below the crusher 18 is a container 30. Associated with the container 30 is a level detection means 32 comprising an upper level detector 34, a lower level detector 36 and a signal processing circuit 38. Level detectors 34 and 36 may be the Automatic Products, Inc. "Dynatrol CL-10DJ-10 inch" level detector, having stainless steel contact parts, complete with "Type EC-501-A" control unit. This particular type of detector is a vibratory detector whose vibration is stopped by ash 12 which is packed around the detector and not flowing past it. This type of detector generates an "off" signal or an "on" signal which may be used to control other functions associated with the gasification system. In FIG. 2, the detectors 34 and 36 are connected electrically to the signal processing circuit 38. The signal processing circuit 38 controls the operation of the crusher 18 by turning the crusher motor 28 on or off.

The ash removal system 10 operates in the following manner. Ash 12 falls from the gasifier 8 through the plenum 14, into the crusher housing 16, and down to the grate 24. Small particles of ash 12 will pass between the grate blades 26, but large particles of ash 12 will rest on top of the grate blades 26. As the crusher 18 rotates, the crusher blades 22 crush the ash 12 against the grate blades 26. Particles of ash 12 which are now small enough to pass between the grate blades 26 fall into the container 30. The ash 12 which falls into the container 30 then passes through the starwheel lock hopper 42, through the isolation valve 44 and into the ash hopper 46. When the ash hopper 46 is full, the isolation valve 44 is shut and the ash hopper is emptied by opening the ash hopper drain valve 48.

In the event ash 12 is not removed from the hoppers 46 at a sufficiently high rate, the ash 12 will begin to back up into the container 30. When the ash 12 covers the level detector 34, the level detection means 32 either slows or stops the motor 28, thereby (1) allowing container 30 time to discharge and (2) preventing operation of the crusher blades 22 into the ash 12 in the container 30 and thereby avoiding excessive erosion of the crusher blades 22 and grate blades 26. As the container 30 empties, the second level detector 36 is uncovered and the level detection means 32 either starts or increases the speed of the motor 28.

Looking now to FIGS. 5 and 6, the eroding process prevented by the level detection means 32 can be seen. FIG. 5 shows the normal crushing process whereby the crusher blade 22 crushes the particulate ash 12 against the grate blades 26. As the crusher blade 22 passes through the grate blades 26, small ash particulate 12 falls on top of the crusher blade 22 but is not forced between the crusher blade 22 and the grate blade 26. In FIG. 6, as the crusher blade 22 rotates up between the grate blades 26 and through the particulate ash 12, which ash 12 has become densely packed, the crusher blade 22 traps ash 12 between the crusher blade 22 and the grate blade 26. The trapped ash 12 then behaves as an abrasive medium, eroding the crusher blades 22 and the grate blades 26.

We claim:

1. A fluidized bed gasification system comprising:
a fluidized bed gasifier for gasifying organic material;
a crusher apparatus disposed below said gasifier;
a container disposed below said crusher apparatus for conducting waste material from said gasifier;
detection means for detecting the level of said waste material in said container; and
control means responsive to said detection means for controlling the operation of said crusher apparatus.

2. The gasification system according to claim 1, wherein said control means comprises:
an electrical signal processing circuit; and said detection means comprises:
a first level detector probe partially disposed within said container and electrically connected to said electrical signal processing circuit.

3. The gasification system according to claim 2 wherein said detection means further comprises a second level detector partially disposed within said container below said first level detector and electrically connected to said electrical signal processing circuit.

4. The gasification system according to claim 2, wherein said crusher apparatus is disposed between and connected to said gasifier above said crusher apparatus and said container below said crusher apparatus, said crusher apparatus comprising: a crusher disposed within a housing; and, crusher motive means.

5. The gasification system according to claim 4, wherein said signal processing circuit is electrically connected to and controls the operation of said crusher motive means.

6. A fluidized bed gasification system comprising:
a fluidized bed gasifier for gasifying organic material;
a container disposed below said gasifier for conducting waste material from said gasifier;
detection means partially disposed in said container for detecting and determining the level of said waste material in said container, said detection means comprising an electrical signal processing circuit, and a first level detector probe partially disposed within said container and electrically connected to said electrical signal processing circuit;
a crusher apparatus disposed between and connected to said gasifier above said crusher apparatus and said container below said crusher apparatus, said crusher apparatus comprising a crusher disposed within a housing, and crusher motive means; and
wherein said signal processing circuit is electrically connected to and controls the operation of said crusher motive means, and wherein said signal processing circuit causes said crusher motive means to stop when the level of said waste in said container is at or above the level of said first level detector probe and to start when the level of said waste in said container is below the level of said first level detector probe.

7. The gasification system according to claim 5, wherein said signal processing circuit causes said crusher motive means to slow as the level of said waste in said container rises and to accelerate as the level of said waste in said container falls.

8. The gasification system according to claim 3, wherein said crusher apparatus is disposed between and connected to said gasifier above said crusher apparatus and said container below said crusher apparatus, said crusher apparatus comprising: a crusher disposed within a housing; and, crusher motive means.

9. The gasification system according to claim 8, wherein said signal processing circuit is electrically connected to and controls the operation of said crusher motive means.

10. The gasification system according to claim 9, wherein said signal processing circuit causes said crusher motive means to stop when the level of said waste in said container is at or above the level of said first level detector probe and to start when the level of said waste in said container is below the level of said second level detector probe.

11. The gasification system according to claim 9, wherein said signal processing circuit causes said crusher motive means to slow as the level of said waste in said container rises and to accelerate as the level of said waste in said container falls.

12. The gasification system according to claim 1, wherein said crusher apparatus is disposed between and connected to said gasifier above said crusher apparatus and said container below said crusher apparatus, said crusher apparatus comprising: a crusher disposed within a housing; and, crusher motive means.

13. A fluidized bed gasification system wherein organic materials are reduced to a useful gas and a solid particulate waste, comprising:
   a fluidized bed gasifier; and
   a waste removal subsystem, further comprising:
   a rotary crusher apparatus disposed below said gasifier;
   a container disposed below said crusher apparatus for conducting said particulate waste from said gasifier;
   detection means partially disposed in said container for detecting and determining the level of said particulate waste in said container; and
   control means responsive to said detection means for controlling the operation of said crusher apparatus.

14. The gasification system according to claim 13, wherein said control means comprises:
   an electrical signal processing circuit; and
   said detection means comprises:
   a first level detector probe partially disposed within said container and electrically connected to said electrical signal processing circuit.

15. The gasification system according to claim 14 wherein said level detection means further comprises a second level detector partially disposed within said container below said first level detector and electrically connected to said electrical signal processing circuit.

16. The gasification system according to claim 14, wherein said crusher apparatus is disposed between and connected to said gasifier above said crusher apparatus and said container below said crusher apparatus, said crusher apparatus comprising: a rotary crusher disposed within a housing; and crusher motive means.

17. The gasification system according to claim 16, wherein said signal processing circuit is electrically connected to and controls the operation of said crusher motive means.

18. The gasification system according to claim 17, wherein said signal processing circuit causes said crusher motive means to stop when the level of said waste in said container is at or above the level of said first level detector probe and to start when the level of said waste in said container is below the level of said first level detector probe.

19. The gasification system according to claim 17, wherein said signal processing circuit causes said crusher motive means to slow as the level of said waste in said container rises and to accelerate as the level of said waste in said container falls.

20. The gasification system according to claim 15, wherein said crusher apparatus is disposed between and connected to said gasifier above said crusher apparatus and said container below said crusher apparatus, said crusher apparatus comprising: a rotary crusher disposed within a housing; and crusher motive means.

21. The gasification system according to claim 20, wherein said signal processing circuit is electrically connected to and controls the operation of said crusher motive means.

22. The gasification system according to claim 21, wherein said signal processing circuit causes said crusher motive means to stop when the level of said waste in said container is at or above the level of said first level detector probe and to start when the level of said waste in said container is below the level of said second level detector probe.

23. The gasification system according to claim 21, wherein said signal processing circuit causes said crusher motive means to slow as the level of said waste in said container rises and to accelerate as the level of said waste in said container falls.

24. The gasification system according to claim 13, wherein said crusher apparatus is disposed between and connected to said gasifier above said crusher apparatus and said container below said crusher apparatus, said crusher apparatus comprising: a rotary crusher disposed within a housing; and a crusher motive means.

* * * * *